United States Patent
Lee et al.

(10) Patent No.: US 9,585,163 B2
(45) Date of Patent: Feb. 28, 2017

(54) METHOD AND APPARATUS FOR INFORMATION ON INTERFERENCE FOR DEVICE-TO-DEVICE CONNECTION IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 80 days.

(21) Appl. No.: 14/409,392

(22) PCT Filed: Jul. 22, 2013

(86) PCT No.: PCT/KR2013/006532
§ 371 (c)(1),
(2) Date: Dec. 18, 2014

(87) PCT Pub. No.: WO2014/014325
PCT Pub. Date: Jan. 23, 2014

(65) Prior Publication Data
US 2015/0257196 A1 Sep. 10, 2015

Related U.S. Application Data (60) Provisional application No. 61/673,739, filed on Jul. 20, 2012.

(51) Int. Cl.
*H04W 72/14* (2009.01)
*H04W 76/04* (2009.01)
(Continued)

(52) U.S. Cl.
CPC .......... *H04W 72/14* (2013.01); *H04W 8/005* (2013.01); *H04W 8/14* (2013.01); *H04W 8/24* (2013.01);
(Continued)

(58) Field of Classification Search
None
See application file for complete search history.

(56) References Cited

U.S. PATENT DOCUMENTS

2007/0097926 A1   5/2007  Liu et al.
2007/0258402 A1  11/2007  Nakamata et al.
(Continued)

FOREIGN PATENT DOCUMENTS

CN    102365897 A    2/2012
EP      2773129 A1    9/2014
(Continued)

OTHER PUBLICATIONS

Marsch et al., "Future Mobile Communication Networks: Challenges in the Design and Operation," IEEE Vehicular Technology Magazine, vol. 7, No. 1, Mar. 2012 (published Jan. 27, 2012), pp. 16-23.
(Continued)

*Primary Examiner* — Mohammad Adhami
(74) *Attorney, Agent, or Firm* — Birch, Stewart, Kolasch & Birch, LLP (57) ABSTRACT

A method and apparatus for transmitting information on interference for a device-to-device (D2D) connection in a wireless communication system is provided. A first mobile device detects interference on subframes allocated to a connection with a second mobile device, and transmits information on the subframes in which the interference is detected, to either the second mobile device or a network.

3 Claims, 7 Drawing Sheets

(51) Int. Cl.

| | | |
|---|---|---|
| *H04W 36/00* | (2009.01) | |
| *H04W 8/00* | (2009.01) | |
| *H04W 60/04* | (2009.01) | |
| *H04W 68/02* | (2009.01) | |
| *H04W 8/14* | (2009.01) | |
| *H04W 76/02* | (2009.01) | |
| *H04W 8/24* | (2009.01) | |
| *H04W 24/08* | (2009.01) | |
| *H04W 72/04* | (2009.01) | |
| *H04W 88/06* | (2009.01) | |
| *H04W 24/10* | (2009.01) | |
| *H04W 92/18* | (2009.01) | |

(52) U.S. Cl.
CPC ....... *H04W 24/08* (2013.01); *H04W 36/0061* (2013.01); *H04W 60/04* (2013.01); *H04W 68/02* (2013.01); *H04W 72/042* (2013.01); *H04W 76/023* (2013.01); *H04W 76/027* (2013.01); *H04W 76/043* (2013.01); *H04W 76/046* (2013.01); *H04W 76/048* (2013.01); *H04W 24/10* (2013.01); *H04W 76/021* (2013.01); *H04W 88/06* (2013.01); *H04W 92/18* (2013.01)

(56) References Cited

U.S. PATENT DOCUMENTS

| | | |
|---|---|---|
| 2009/0270025 A1 | 10/2009 | Kossi et al. |
| 2009/0316633 A1 | 12/2009 | Kato et al. |
| 2010/0240312 A1 | 9/2010 | Peng et al. |
| 2010/0261469 A1 | 10/2010 | Ribeiro et al. |
| 2010/0279695 A1 | 11/2010 | Amirijoo et al. |
| 2011/0261747 A1 | 10/2011 | Wang et al. |
| 2012/0020231 A1* | 1/2012 | Chen .................. H04W 36/08 370/252 |
| 2012/0122502 A1 | 5/2012 | Shin et al. |
| 2012/0163235 A1 | 6/2012 | Ho et al. |
| 2013/0064103 A1 | 3/2013 | Koskela et al. |
| 2013/0107722 A1 | 5/2013 | Huang |
| 2013/0107782 A1 | 5/2013 | Anas et al. |
| 2013/0156000 A1 | 6/2013 | Hwang |
| 2013/0170387 A1* | 7/2013 | Wang .................. H04W 4/005 370/252 |
| 2013/0208641 A1* | 8/2013 | Baghel .................. H04B 1/109 370/311 |
| 2013/0272294 A1 | 10/2013 | Mildh et al. |
| 2013/0322277 A1* | 12/2013 | Vanganuru ............ H04W 24/08 370/252 |
| 2013/0329711 A1 | 12/2013 | Seo et al. |
| 2014/0036718 A1 | 2/2014 | Gao et al. |
| 2014/0038629 A1 | 2/2014 | Iwamura et al. |
| 2014/0200016 A1* | 7/2014 | Siomina ................ H04W 24/08 455/450 |
| 2014/0335875 A1 | 11/2014 | Li et al. |
| 2015/0156757 A1 | 6/2015 | Kalhan |
| 2015/0304969 A1 | 10/2015 | Morita et al. |

FOREIGN PATENT DOCUMENTS

| | | |
|---|---|---|
| JP | 2014-504814 A | 2/2014 |
| WO | WO 2011/109027 A1 | 9/2011 |
| WO | WO 2012/034269 A1 | 3/2012 |
| WO | WO 2012/088470 A1 | 6/2012 |
| WO | WO 2012/144320 A1 | 10/2012 |

OTHER PUBLICATIONS

Fodor et al., "Design Aspects of Network Assisted Device-to-Device Communications," IEEE Communications Magazine, vol. 50, Issue 3, Mar. 5, 2012, pp. 170-177.

Intel Corporation, "Suggested D2D Terminologies (Operator Managed, Operator Assisted, Operator Free)," 3GPP TSG-SA WG1 Meeting #57, Kyoto, Japan, S1-120059, Feb. 13-17, 2012, 3 pages.

* cited by examiner

METHOD AND APPARATUS FOR INFORMATION ON INTERFERENCE FOR DEVICE-TO-DEVICE CONNECTION IN WIRELESS COMMUNICATION SYSTEM

CROSS REFERENCE TO RELATED APPLICATIONS

This application is the National Phase of PCT/KR2013/006532 filed on Jul. 22, 2013, which claims priority under 35 U.S.C. 119(e) to U.S. Provisional Application No. 61/673,739 filed on Jul. 20, 2012, all of which are hereby expressly incorporated by reference into the present application.

TECHNICAL FIELD

The present invention relates to wireless communications, and more particularly, to a method and apparatus for transmitting information on interference for a device-to-device (D2D) connection in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

With the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained.

How a network and UEs should operate for D2D connection should be specified.

SUMMARY OF INVENTION

Technical Problem

The present invention provides a method and apparatus for transmitting information on interference for a device-to-device (D2D) connection in a wireless communication system. The present invention provides a method for handling interference for the D2D connection.

Solution to Problem

In an aspect, a method for transmitting, by a first mobile device, information on interference for a device-to-device (D2D) connection in a wireless communication system is provided. The method includes detecting interference on subframes allocated to a connection with a second mobile device, and transmitting information on the subframes in which the interference is detected, to either the second mobile device or a network.

The interference may occur between the connection with the second mobile device and a connection with the network.

The interference may occur between the connection with the second mobile device and a connection between the second mobile device and the network.

The information on the subframes in which the interference is detected may be subframe patterns informing which subframes undergo the interference.

The information on the subframes in which the interference is detected may be transmitted via an in-device coexistence (IDC) indication.

The IDC indication may include an identity of the first mobile device or an identity of the second mobile device.

The IDC indication may include at least one of whether or not the first mobile device is connected to a radio access network (RAN), which type of the RAN the first mobile device is connected to, and an identity of a cell to which the first mobile device is connected.

In another aspect, a method for transmitting, by a first serving eNodeB (eNB), information on interference for a device-to-device (D2D) connection in a wireless communication system is provided. The method includes receiving an IDC indication from a first mobile device served by the first serving eNB, transmitting D2D interference information to a second serving eNB, and receiving D2D resource information, including information on a D2D almost blank subframe (ABS) pattern, from the second serving eNB.

The D2D interference information may include information on the subframes in which interference is detected.

The D2D interference information may include an identity of the first mobile device or an identity of a second mobile device which is connected with the first mobile device by the D2D connection.

The D2D interference information may include at least one of whether or not the first mobile device is connected to a radio access network (RAN), which type of the RAN the first mobile device is connected to, and an identity of a cell to which the first mobile device is connected.

The D2D resource information may include an identity of the first mobile device.

Advantageous Effects of Invention

Interference between a D2D connection and a radio resource control (RRC) connection can be reduced.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
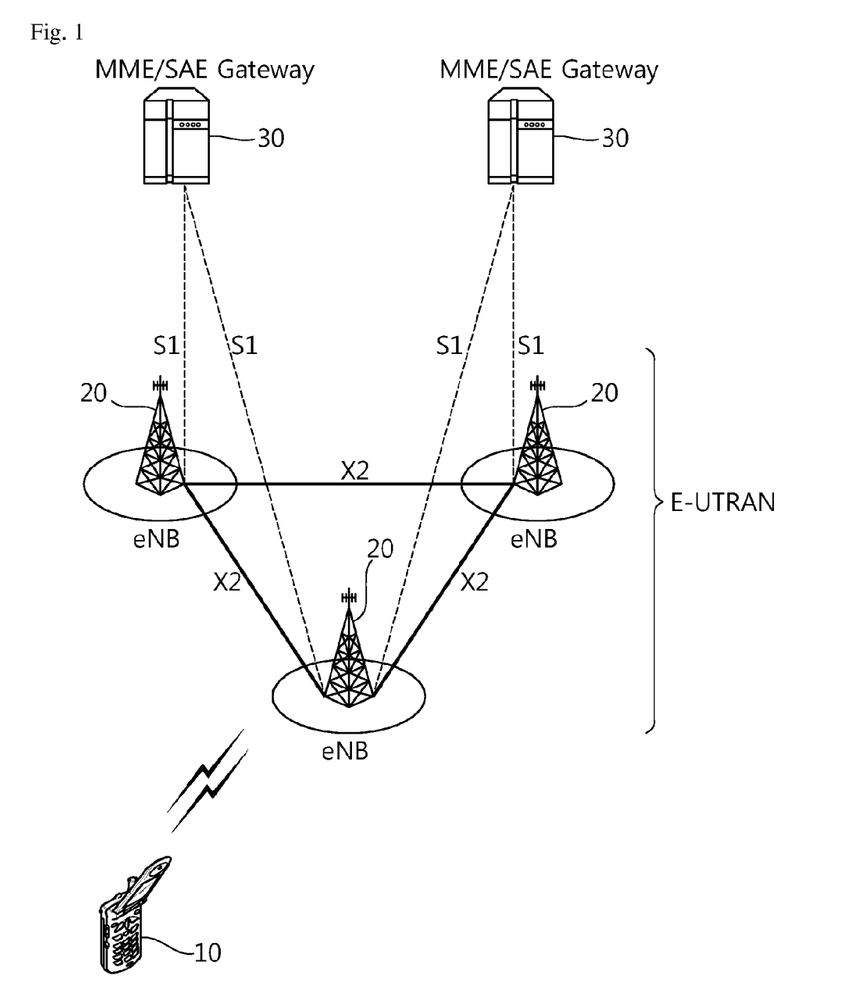
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
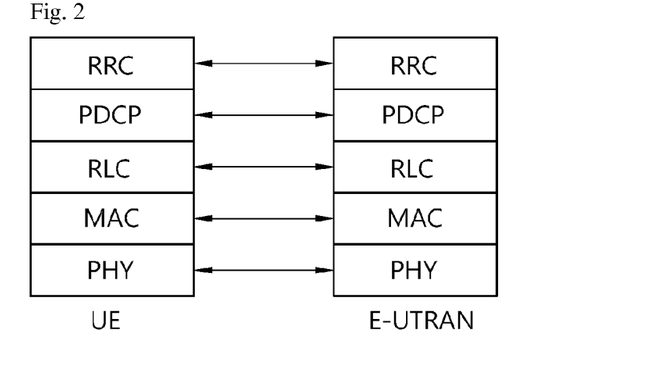
FIG. 2 is a diagram showing radio interface protocol architecture for a control plane.
Figure 3:
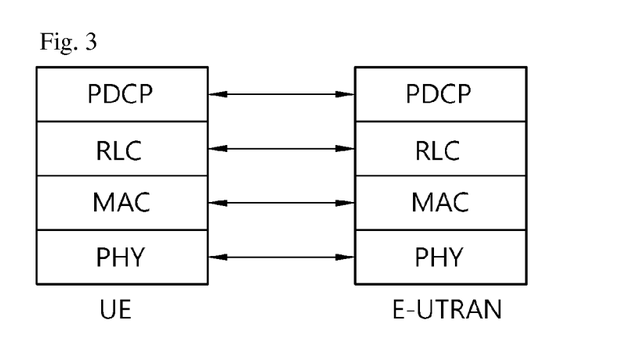
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
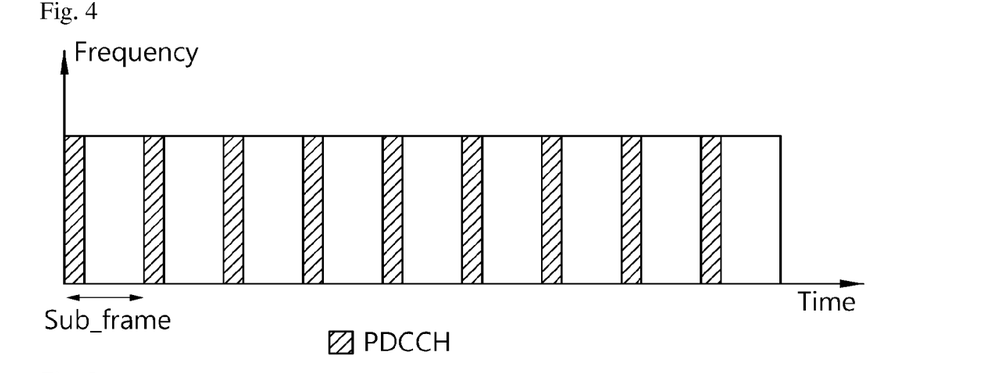
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A radio resource state (RRC) state indicates whether an RRC of a user equipment (UE) is logically connected to an RRC of a network. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED has the RRC connection established with the network, the network can recognize the existence of the UE in the RRC_CONNECTED and can effectively control the UE. Meanwhile, the UE in the RRC_IDLE cannot be recognized by the network, and a core network (CN) manages the UE in unit of a tracking area (TA) which is a larger area than a cell. That is, only the existence of the UE in the RRC_IDLE is recognized in unit of a large area, and the UE must transition to the RRC_CONNECTED to receive a typical mobile communication service such as voice or data communication.

When the user initially powers on the UE, the UE first searches for a proper cell and then remains in the RRC_IDLE in the cell. When there is a need to establish an RRC connection, the UE which remains in the RRC_IDLE may establish the RRC connection with the RRC of the network through an RRC connection procedure and then may transition to the RRC_CONNECTED. The UE which remains in the RRC_IDLE may need to establish the RRC connection with the network when uplink data transmission is necessary due to a user's call attempt or the like or when there is a need to transmit a response message upon receiving a paging message from the network.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED. To access the network, the UE may perform a process of registering to the network through an initial attach procedure. If the initial attach procedure is successfully performed, the UE and the MME may be in the EMM-REGISTERED.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE establishes an RRC connection with the E-UTRAN, the UE may be in the ECM-CONNECTED. When the MME in the ECM-IDLE establishes an S1 connection with the E-UTRAN, the MME may be in the ECM-CONNECTED. When the UE is in the ECM-IDLE, the E-UTRAN does not have information on the context of the UE. Therefore, the UE in the ECM-IDLE can perform a UE-based mobility related procedure such as cell selection or cell reselection without having to receive a command of the network. If a location of the UE in the ECM-IDLE becomes different from a location known to the network, the UE may report the location of the UE to the network through a tracking area update procedure. On the other hand, the mobility of the UE in the ECM-CONNECTED may be managed by the command of the network.

In-device coexistence (IDC) interference will be described.

In order to allow users to access various networks and services ubiquitously, an increasing number of UEs are equipped with multiple radio transceivers. For example, a UE may be equipped with LTE, Wi-Fi, Bluetooth transceivers, and global navigation satellite system (GNSS) receivers. One resulting challenge lies in trying to avoid coexistence interference between those collocated radio transceivers.

Figure 5:
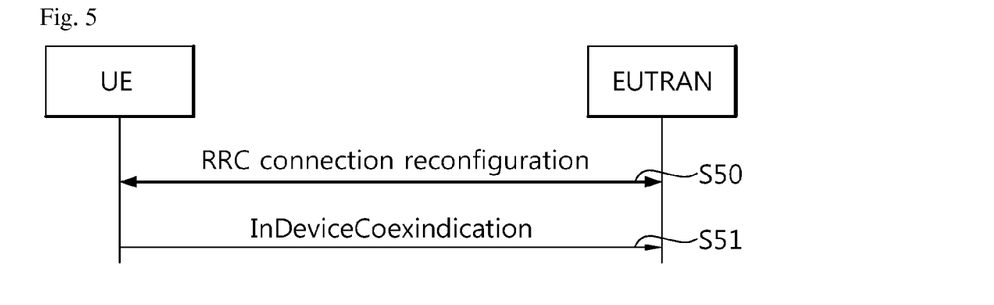
FIG. 5 shows an in-device coexistence (IDC) indication procedure.

FIG. 5 shows an in-device coexistence (IDC) indication procedure. The purpose of this procedure is to inform the E-UTRAN about (a change of) IDC problems experienced by the UE in RRC_CONNECTED and to provide the E-UTRAN with information in order to resolve them.

Referring to FIG. 5, at step S50, the UE and the E-UTRAN performs an RRC connection reconfiguration procedure. At step S51, the UE transmits an in-device coexistence indication (IndeviceCoexIndication) message to the E-UTRAN.

Figure 6:
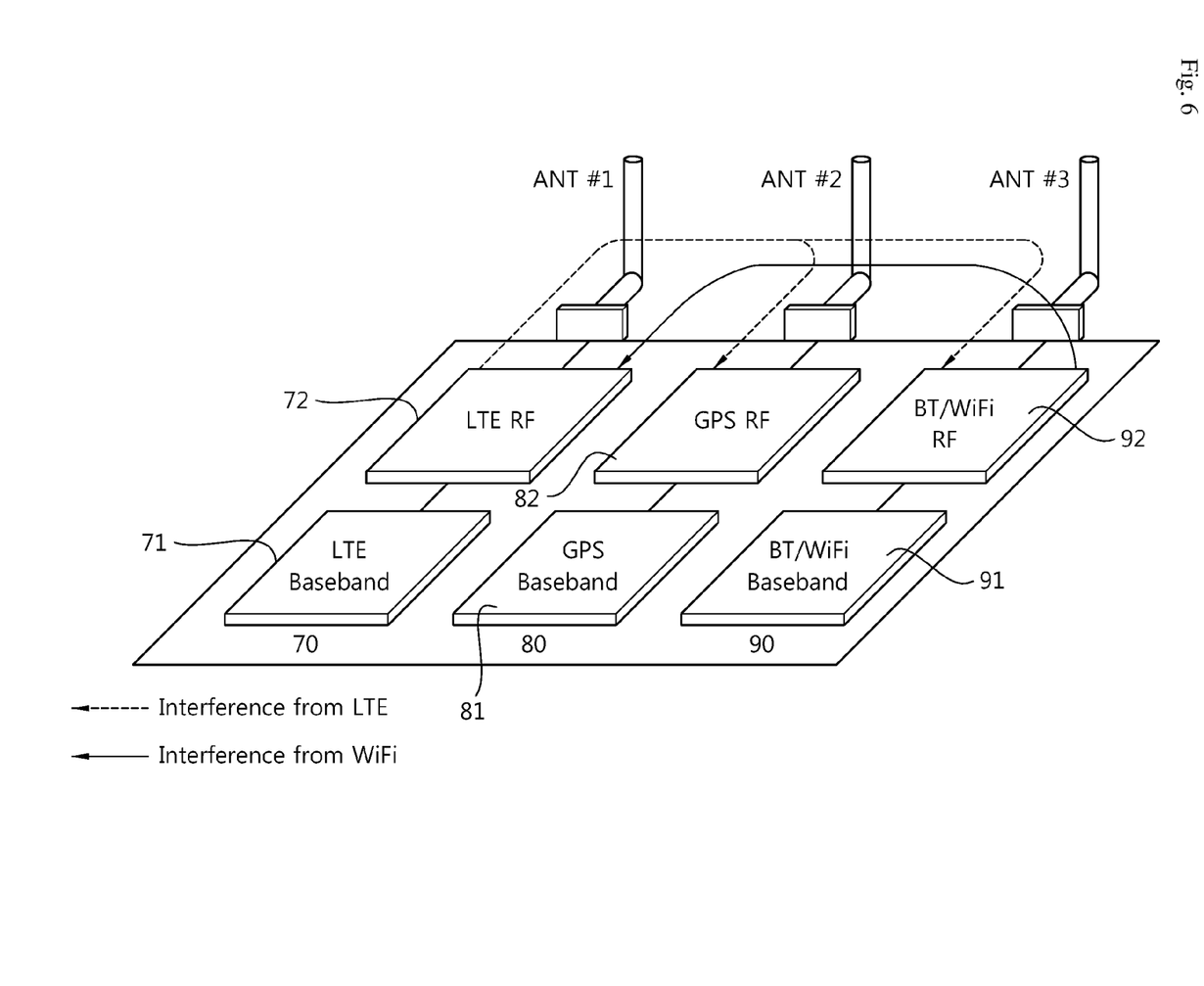
FIG. 6 shows an example of coexistence interference within the same UE.

FIG. 6 shows an example of coexistence interference within the same UE.

A LTE module 70 includes a LTE baseband 71 and a LTE radio frequency (RF) 72. A GPS module 80 includes a GPS baseband 81 and a GPS RF 82. A Bluetooth/Wi-Fi module 90 includes a Bluetooth/Wi-Fi baseband 91 and a Bluetooth/Wi-Fi RF 92.

Due to extreme proximity of multiple radio transceivers within the same UE, the transmit power of one transmitter may be much higher than the received power level of another receiver. Accordingly, different RATs within the same UE operating on adjacent frequencies causes interference to each other. For example, if all of the LTE module 70, the GPS module 80 and the Bluetooth/Wi-Fi module 90 are switched on, the LTE module 70 may interfere the GPS module 80 and the Bluetooth/Wi-Fi module 90. Or the Bluetooth/Wi-Fi module 90 may interfere the LTE module 70. The LTE module 70 can measure the IDC interference by cooperating with other radio modules or by inter/intra frequency measurements.

Coexistence scenarios are due to adjacent frequencies between different radio technologies. To describe coexistence interference scenarios between LTE radio and other radio technologies, 3GPP frequency bands around 2.4 GHz industrial, scientific and medical (ISM) bands are considered.

Figure 7:
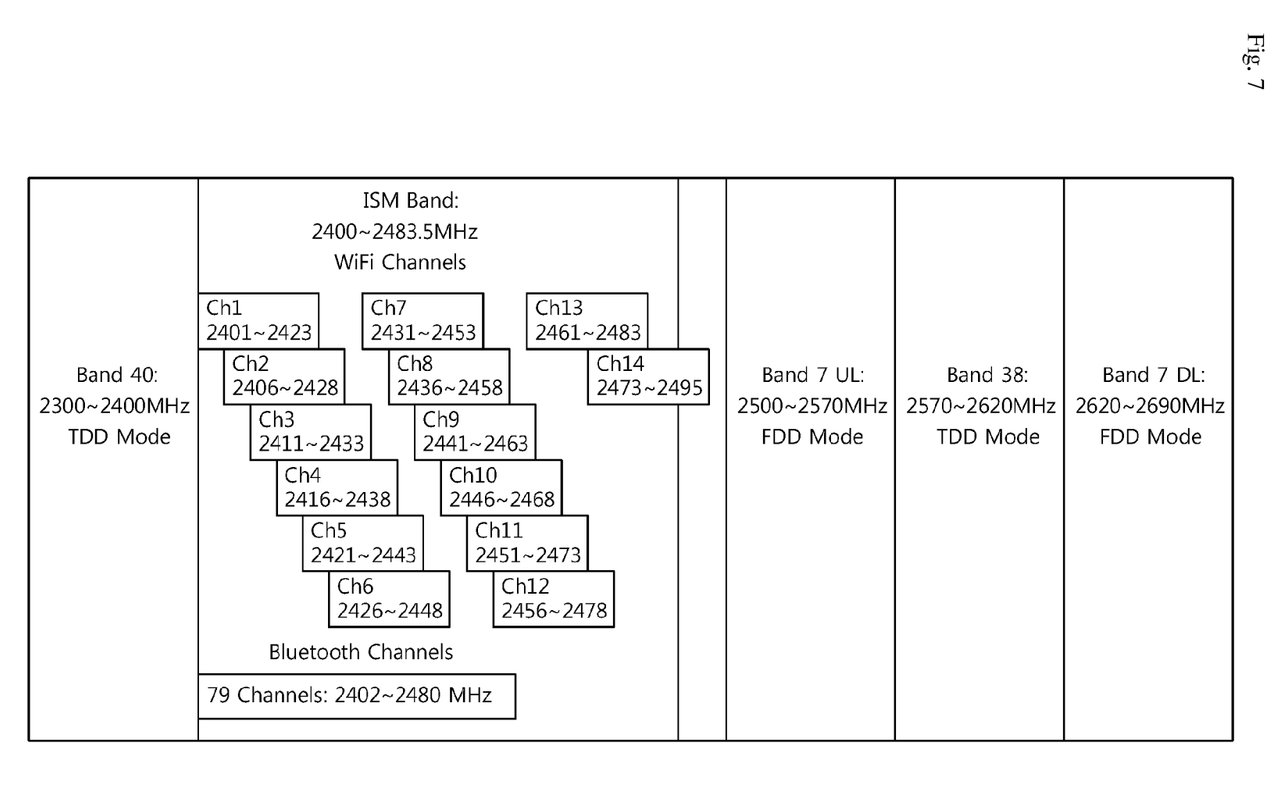
FIG. 7 shows 3GPP frequency bands around ISM band.

FIG. 7 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

The transmitter of LTE band 7/13/14 may cause interference to the receiver of GNSS at 1575.42 MHz.

Device-to-device (D2D) connection is described below.

The D2D connection is a connection between one master UE (M-UE) and one slave UE (S-UE). That is, the D2D connection is a direct connection between UEs. The M-UE may control the D2D connection with the S-UE autonomously (i.e. UE autonomous mode) or under full/partial control of an E-UTRAN (i.e. E-UTRAN planned mode). One M-UE may configure zero, one or more D2D connections. Different D2D connections may be established with different S-UEs.

The E-UTRAN may configure following two D2D modes in a cell. Only one D2D mode may be configured for a specific cell, for a specific M-UE, for a specific S-UE, or for a specific D2D connection between one M-UE and one S-UE.

1) E-UTRAN planned mode: The E-UTRAN (i.e. eNodeB (eNB) serving the M-UE called 'serving eNB') is responsible for maintaining D2D connection (in terms of radio resource or quality of service (QoS) over D2D connection). The serving eNB has S-UE context for the S-UE connected to the M-UE. A mobility management entity (MME) connected to the serving eNB has S-UE context for the S-UE connected to the M-UE.

2) UE autonomous mode: The M-UE is responsible for maintaining D2D connection (in terms of radio resource or QoS over D2D connection). The serving eNB has no S-UE context for the S-UE connected to the M-UE. The MME connected to the serving eNB may or may not have S-UE context for the S-UE connected to the M-UE.

The S-UE may or may not have an RRC connection with either the serving eNB or another eNB for both modes.

In addition, a D2D hybrid mode may be defined. In the D2D hybrid mode, both the UE autonomous mode and the E-UTRAN planned mode are used for a single D2D connection between one M-UE and one S-UE. Which mode between the UE autonomous and the E-UTRAN planned mode is used for the D2D connection may depend on QoS of D2D radio bearers between the M-UE and the S-UE. For example, a D2D DRB for voice or video service may be established based on the E-UTRAN planned mode. A D2D DRB for data downloading/uploading service may be established based on the UE autonomous mode. Semi-persistent scheduling (SPS) transmissions over the D2D connection may be configured by the serving eNB in the E-UTRAN Planned Mode. Which mode between the UE autonomous and E-UTRAN planned mode is used for the D2D connection may decided by the serving eNB. When the M-UE makes a D2D connection with the S-UE, the M-UE may transmit information about this D2D connection establishment to the serving eNB. Upon receiving the information from the M-UE, the serving eNB ma inform the M-UE which mode should be configured for this D2D connection among the UE autonomous, the E-UTRAN planned, and the hybrid mode.

Hereinafter, it is assumed that the serving eNB is an eNB serving the M-UE. If the eNB serves the S-UE, but it does not serve the M-UE, the eNB is clearly written as 'S-UE serving eNB' hereinafter. When the S-UE serving eNB is used to express a certain procedure, 'M-UE serving eNB' may be also used.

Followings are identities used for the D2D connection.
  M-CRNTI: cell radio network temporary identity (C-RNTI) allocated for the M-UE
  S-CRNTI: C-RNTI allocated for the S-UE
  S-UE identity: The S-UE identity may correspond to one of an international mobile subscriber identity (IMSI), a system architecture evolution (SAE) temporary mobile subscriber identity (S-TMSI), an S-CRNTI, and a new UE identity allocated to the S-UE. The S-UE identity may be allocated by the M-UE, the M-UE serving eNB, the S-UE serving eNB, or an EPC node such as MME/home location register (HLR).

Followings are channels used for the D2D connection.

D2D downlink: a direction from the M-UE to the S-UE

D2D uplink: a direction from the S-UE to the M-UE

D-BCCH: D2D downlink broadcast control channel used over the D2D connection. The M-UE broadcasts the D-BCCH to one or more S-UEs, e.g. for delivery of D2D system information or helping an S-UE detect another UE for the D2D connection.

D-RACH: D2D uplink random access channel used over the D2D connection. The M-UE may allocate radio resources for the D-RACH. The S-UE may know configuration of the D-RACH by receiving information on the D-BCCH. The S-UE may transmit a preamble or message over the D-RACH to the M-UE, in order to make a connection with the M-UE or in order to transmit data to the M-UE.

D-CCCH: D2D uplink/downlink common control channel used over the D2D connection.

D-DCCH: D2D uplink/downlink dedicated control channel used over the D2D connection.

D2D RB: radio bearer which is established over the D2D connection between the M-UE and the S-UE. A DRB and a SRB may be provided for D2D user data and D2D control info, respectively.

Figure 8:
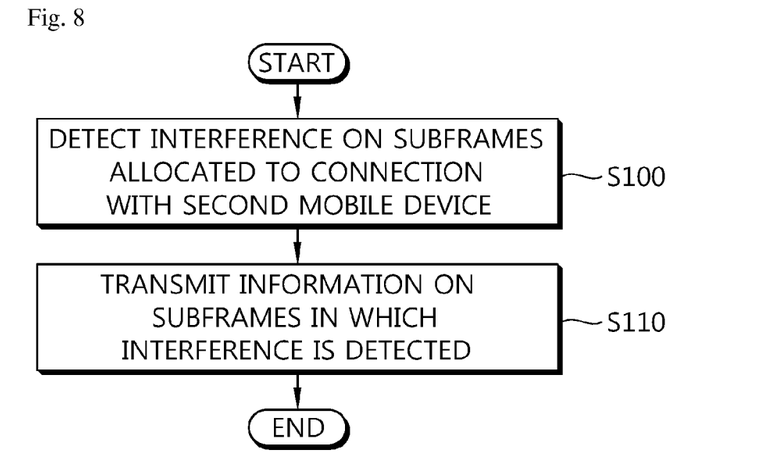
FIG. 8 shows an example of a method for transmitting information on interference for a D2D connection according to an embodiment of the present invention.

FIG. 8 shows an example of a method for transmitting information on interference for a D2D connection according to an embodiment of the present invention.

At step S100, a first mobile device detects interference on subframes allocated to a connection with a second mobile device. The interference may occur between the connection with the second mobile device and a connection with the network, or may occur between the connection with the second mobile device and a connection between the second mobile device and the network. In this case, the first mobile device may be the S-UE of D2D connection, or the M-UE of the D2D connection. The second mobile device may be the M-UE of D2D connection, or the S-UE of the D2D connection.

At step S110, the first mobile device transmits information on the subframes in which the interference is detected, to either the second mobile device or the network. The information on the subframes in which the interference is detected may be subframe patterns informing which subframes undergo the interference. The information on the subframes in which the interference is detected may be transmitted via an in-device coexistence (IDC) indication. The IDC indication may include an identity of the first mobile device or an identity of the second mobile device, whether or not the first mobile device is connected to a radio access network (RAN), which type of the RAN the first mobile device is connected to, and an identity of a cell to which the first mobile device is connected.

Figure 9:
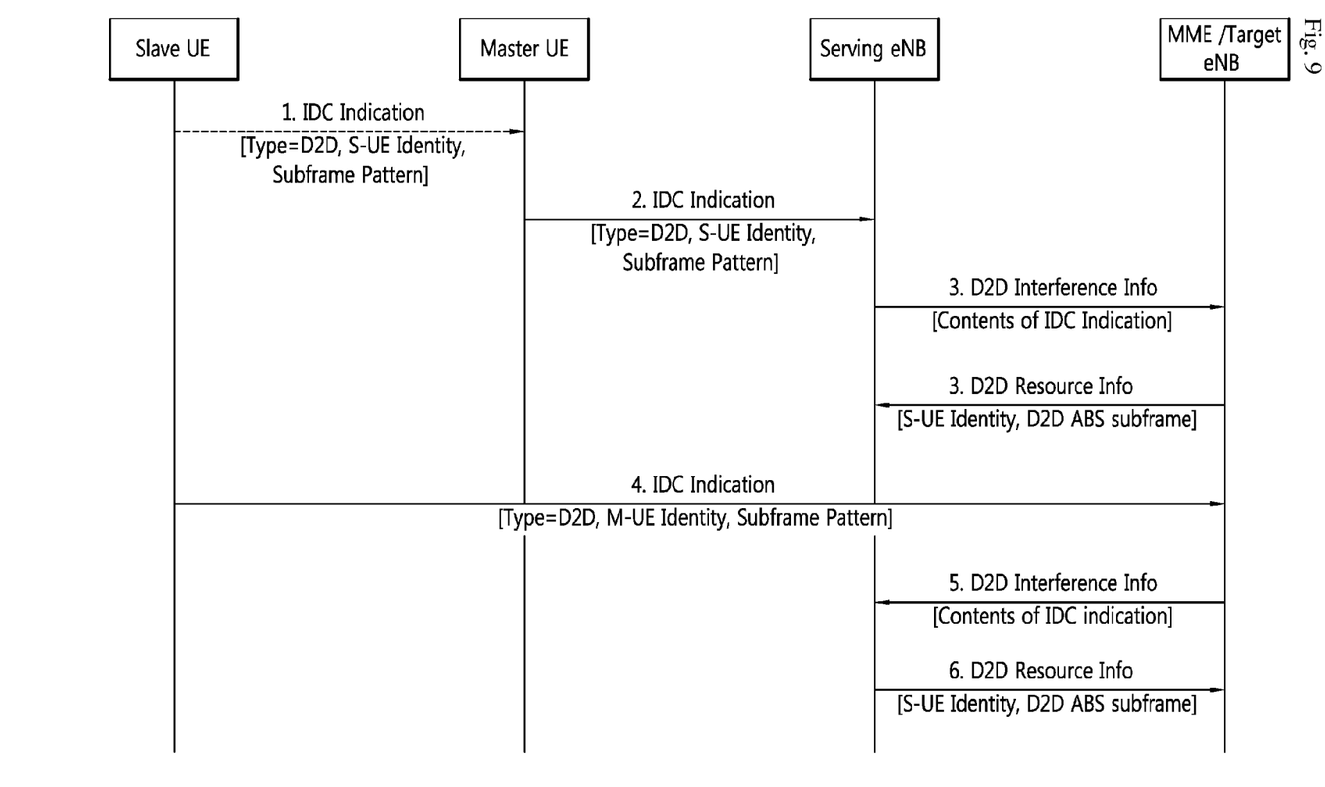
FIG. 9 shows an example of a method for D2D interference alleviation in an E-UTRAN planned mode according to an embodiment of the present invention.

FIG. 9 shows an example of a method for D2D interference alleviation in an E-UTRAN planned mode according to an embodiment of the present invention.

1. If the S-UE has interference problem over D2D connection (and if the S-UE is in RRC_CONNECTED), the S-UE may transmit an IDC Indication to the M-UE. The IDC indication may be used not only for interference from ISM band, but also for interference from 3GPP system/network. The IDC indication may indicate an S-UE identity, a type indicator informing that the interference problem comes from 3GPP system/network over the D2D connection, and a subframe pattern for informing which subframes undergo the interference problem. The IDC indication may also indicate the followings:

Whether or not the S-UE is connected to a radio access network (RAN), i.e. whether the S-UE is RRC_CONNECTED or RRC_IDLE Which type of RAN the S-UE is connected to, i.e. one of E-UTRAN, UTRAN FDD, UTRAN TDD, GSM/EDGE radio access network (GERAN), CDMA2000 high rate packet data (HRPD), CDMA2000 1×RTT, and Wi-Fi (IEEE 802 access point)

Identity of a cell which the S-UE is connected to or camping on

2. While the M-UE is in RRC_CONNECTED, if the M-UE has interference problem over D2D connection, or if the M-UE receives the IDC indication from the S-UE, the M-UE may transmit the IDC indication to the M-UE serving eNB, e.g. in the E-UTRAN planned mode.

3. If the M-UE serving eNB and the S-UE serving eNB are different, the M-UE serving eNB may transmit D2D interference information to the S-UE serving eNB. The D2D interference information may include contents of the IDC indication.

Upon reception of the D2D interference information from the M-UE serving eNB, the S-UE serving eNB may transmit D2D resource information including the S-UE Identity and a D2D almost blank subframe (ABS) pattern. DL/UL radio transmissions between the S-UE and the S-UE serving eNB may be restricted in D2D ABS according to the D2D ABS pattern.

4. While the S-UE is in RRC_CONNECTED, if the S-UE has interference problem over D2D connection, or if the S-UE receives the IDC indication from the M-UE, the S-UE may transmit the IDC indication to the S-UE serving eNB, e.g. in the E-UTRAN Planned mode. The IDC indication may indicate an M-UE identity, a type indicator informing that the interference problem comes from 3GPP system/network over the D2D connection, and a subframe pattern for informing which subframes undergo the interference problem. The IDC indication may also indicate the followings:

Whether or not the S-UE is connected to a radio access network (RAN), i.e. whether the S-UE is RRC_CONNECTED or RRC_IDLE Which type of RAN the S-UE is connected to, i.e. one of E-UTRAN, UTRAN FDD, UTRAN TDD, GSM/EDGE radio access network (GERAN), CDMA2000 high rate packet data (HRPD), CDMA2000 1×RTT, and Wi-Fi (IEEE 802 access point)

Identity of a cell which the S-UE is connected to or camping on

5. The S-UE serving eNB may transmit D2D interference information to the M-UE serving eNB. The D2D interference information may include contents of the IDC indication.

6. Upon reception of the D2D interference information from the S-UE serving eNB, the M-UE serving eNB may transmit D2D resource information including the S-UE identity and a D2D ABS pattern. DL/UL radio transmissions between the M-UE and the M-UE serving eNB are restricted in D2D ABS according to the D2D ABS pattern.

Figure 10:
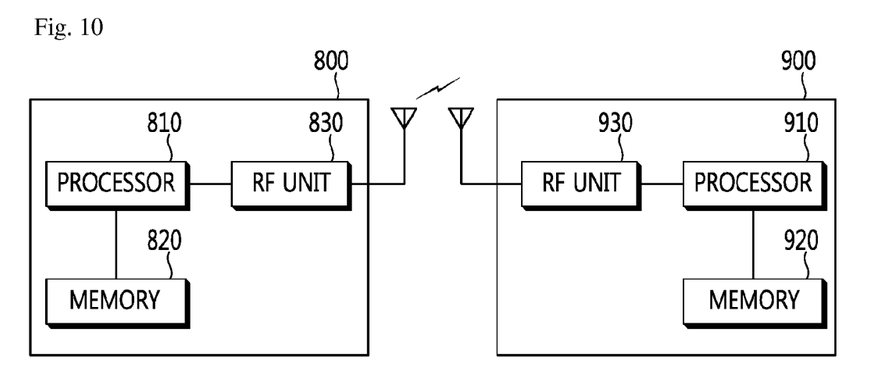
FIG. 10 is a block diagram showing wireless communication system to implement an embodiment of the present invention.

FIG. 10 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting information on interference for a device-to-device (D2D) connection in a wireless communication system, the method comprising:
   detecting, by a slave-user equipment (S-UE), an interference on one or more subframes allocated to a connection with a master-user equipment (M-UE); and
   after detecting the interference on one or more subframes, transmitting, by the S-UE, an in-device coexistence (IDC) indication to the M-UE when the S-UE is in a radio resource control (RRC) connected mode,
   wherein the IDC indication includes an identity of the S-UE, a D2D indicator informing that the interference is caused from a Third Generation Partnership Project (3GPP) network, and a subframe pattern informing which subframes undergo the interference, and
   wherein the IDC indication indicates when the S-UE is connected to a radio access network (RAN), a type of the RAN that the S-UE is connected to, and an identity of a cell that the S-UE is connected to.

2. The method of claim 1, wherein the interference occurs at the connection with the M-UE.

3. The method of claim 1, wherein the interference further occurs at a connection between the M-UE and the 3GPP network.

* * * * *